(12) United States Patent
Miura et al.

(10) Patent No.: US 11,669,695 B2
(45) Date of Patent: Jun. 6, 2023

(54) TRANSLATION METHOD, LEARNING METHOD, AND NON-TRANSITORY COMPUTER-READABLE STORAGE MEDIUM FOR STORING TRANSLATION PROGRAM TO TRANSLATE A NAMED ENTITY BASED ON AN ATTENTION SCORE USING NEURAL NETWORK

(71) Applicant: FUJITSU LIMITED, Kawasaki (JP)

(72) Inventors: Akiba Miura, Setagaya (JP); Tomoya Iwakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 16/821,273

(22) Filed: Mar. 17, 2020

(65) Prior Publication Data
US 2020/0311352 A1 Oct. 1, 2020

(30) Foreign Application Priority Data

Mar. 29, 2019 (JP) .............................. JP2019-067666

(51) Int. Cl.
*G06F 40/47* (2020.01)
*G06F 40/295* (2020.01)
(Continued)

(52) U.S. Cl.
CPC ............ *G06F 40/47* (2020.01); *G06F 40/295* (2020.01); *G06N 3/049* (2013.01)

(58) Field of Classification Search
CPC ...... G06F 40/295; G06F 40/58; G06F 17/289; G06F 40/53; G06N 7/005
(Continued)

(56) References Cited

U.S. PATENT DOCUMENTS 7,249,013 B2 * 7/2007 Al-Onaizan ............ G06F 40/53
704/277
8,131,536 B2 * 3/2012 Weischedel ............ G06F 40/58
704/5

(Continued)

FOREIGN PATENT DOCUMENTS

JP 2006-338261 A 12/2006
JP 2008-225963 A 9/2008
(Continued)

OTHER PUBLICATIONS

Ugawa et al.,"Neural Machines Translation Using Named Entity Information", Proceedings of the Twenty-fourth Annual Meeting of the Association for Natural Language Processing [online], Japan, The Association for Natural Language Processing Society, Mar. 5, 2018, pp. 25-28, Cited in JPOA dated Nov. 22, 2022 for corresponding Japanese Patent Application No. 2019-067666.

(Continued)

*Primary Examiner* — Farzad Kazeminezhad
(74) *Attorney, Agent, or Firm* — Fujitsu Patent Center

(57) ABSTRACT

A translation method, implemented by a computer, includes: converting a text written in a first language into a replacement text in which a named entity in the text is replaced with a predetermined character string; translating the replacement text into a second language by using a text translation model which is a neural network; and translating a named entity corresponding to the predetermined character string in the replacement text into the second language by using a named entity translation model which is a neural network.

5 Claims, 15 Drawing Sheets

(51) Int. Cl.
*G06F 40/58* (2020.01)
*G06N 3/049* (2023.01)

(58) Field of Classification Search
USPC .................................... 704/4, 5, 9, 2
See application file for complete search history.

(56) References Cited

U.S. PATENT DOCUMENTS

| | | | |
|---|---|---|---|
| 2014/0163951 A1* | 6/2014 | Nikoulina | G06F 40/295 704/4 |
| 2014/0303959 A1* | 10/2014 | Orsini | G06Q 10/107 704/2 |
| 2017/0308526 A1 | 10/2017 | Uchiyama | |
| 2019/0065460 A1* | 2/2019 | Xin | G06N 7/005 |

FOREIGN PATENT DOCUMENTS

| | | | |
|---|---|---|---|
| JP | 2016-099675 A | 5/2016 | |
| JP | 2017-199363 A | 11/2017 | |

OTHER PUBLICATIONS

Japanese Office Action dated Nov. 22, 2022 for corresponding Japanese Patent Application No. 2019-067666, with English Translation, 7 pages. *Please note JP-2016-99675-A cited herewith, was previously cited in an IDS filed on Mar. 17, 2020.*

* cited by examiner

FIG. 15

```
INPUT
■ The 4 cm2 active area permselective separator
  membrane was a 25 micron thick Pd foil.

■ CORRECT ANSWER
  4cm2の活性面積であった選択透過セパレータ膜は
  25ミクロン厚のPdフォイルであった。

■ TRANSLATOR OUTPUT
  4cm2の活性領域は、25ミクロン厚の機能箔であった。
```

TRANSLATION METHOD, LEARNING METHOD, AND NON-TRANSITORY COMPUTER-READABLE STORAGE MEDIUM FOR STORING TRANSLATION PROGRAM TO TRANSLATE A NAMED ENTITY BASED ON AN ATTENTION SCORE USING NEURAL NETWORK

CROSS-REFERENCE TO RELATED APPLICATION

This application is based upon and claims the benefit of priority of the prior Japanese Patent Application No. 2019-67666, filed on Mar. 29, 2019, the entire contents of which are incorporated herein by reference.

FIELD

The embodiment discussed herein is related to a translation method, a learning method, and a non-transitory computer-readable storage medium for storing a translation program.

BACKGROUND

In the related art, neural machine translation is known to perform translation using a neural network. The neural network used in neural machine translation is trained as training data by a bilingual text of a pair of an original text written in a certain language and a translated text written in another language. In the neural machine translation, an encoder and decoder model having an attention mechanism is used, in some cases.

An example of the related art includes Japanese Laid-open Patent Publication No. 2016-099675.

SUMMARY

According to an aspect of the embodiments, provided is a translation method implemented by a computer. The translation method includes: converting a text written in a first language into a replacement text in which a named entity in the text is replaced with a predetermined character string; translating the replacement text into a second language by using a text translation model which is a neural network; and translating a named entity corresponding to the predetermined character string in the replacement text into the second language by using a named entity translation model which is a neural network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 illustrates another translation result in the related art.

DESCRIPTION OF EMBODIMENT(S)

Meanwhile, the above technology has a problem in that it is not possible to appropriately translate a named entity, in some cases. The named entity represents a proper noun such as a person name or an organization name, a numerical representation such as a date or a time, and the like. The named entity is an extended named entity including a technical term such as a chemical substance name, a gene name, a drug name, or the like.

Since there are many types of named entities, there is a tendency that a frequency of appearance in training data is lower than that of general nouns, verbs, and the like, so that the learning is not sufficiently performed, in some cases. It is also conceivable to prepare a translation dictionary with a named entity in advance, but it is difficult to translate a named entity that is not described in the translation dictionary in this case, and it is difficult to cover all the named entities.

In one aspect, the object is to appropriately translate the named entity.

In one aspect, it is possible to appropriately translate the named entity.

Embodiments of a translation method, a translation program, and a learning method disclosed herein will be described in detail below with reference to the drawings. The embodiment does not limit the present disclosure. Each embodiment may be appropriately combined within a range without contradiction. The translation method and the learning method are executed by a translation apparatus. The translation program is also executed in the translation apparatus.

Embodiment 1

Figure 1:
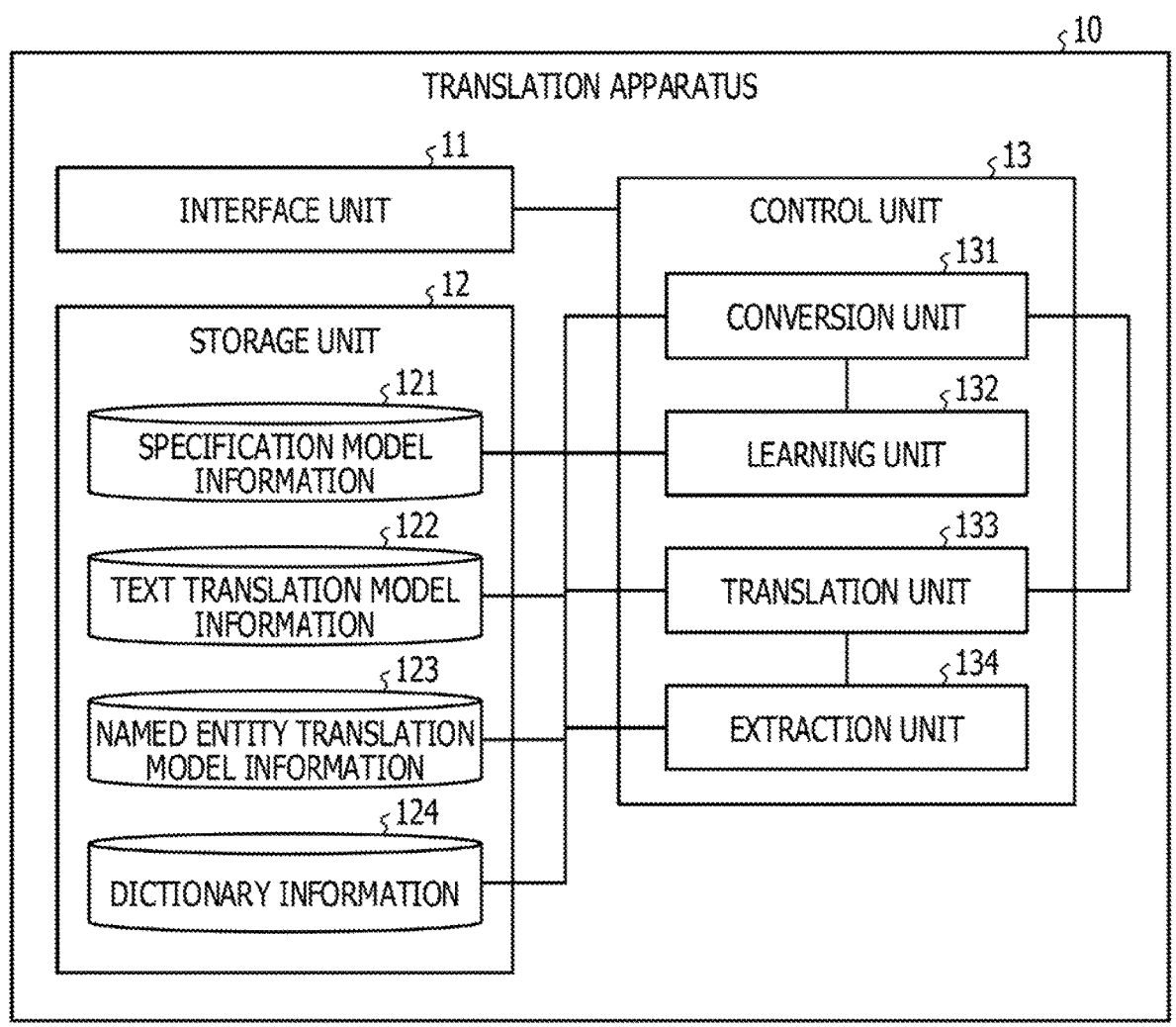
FIG. 1 illustrates an example of a functional configuration of a translation apparatus according to an embodiment.

[Functional Configuration]
A functional configuration of a translation apparatus according to an embodiment will be described with reference to FIG. 1. FIG. 1 is a diagram illustrating an example of a functional configuration of the translation apparatus according to the embodiment. As illustrated in FIG. 1, a translation apparatus 10 includes an interface unit 11, a storage unit 12, and a control unit 13.

The interface unit 11 is an interface for inputting and outputting data to and from other apparatuses, and for performing data communication with other apparatuses. For example, the interface unit 11 performs an input and an output of data between an input apparatus such as a keyboard and a mouse, an output apparatus such as a display and a speaker, and an external storage apparatus such as a USB memory. For example, the interface unit 11 is a network interface card (NIC), and performs data communication via the Internet.

The storage unit 12 is an example of a storage apparatus which stores data and a program to be executed by the control unit 13 and is, for example, a hard disk, a memory, or the like. The storage unit 12 stores specification model information 121, text translation model information 122, named entity translation model information 123, and dictionary information 124.

The specification model information 121 is information for constructing a specification model. The specification model is a model for specifying a named entity from a text written in a first language. For example, the specification model is a learned neural network. In this case, the specification model information 121 is a weight or a bias of the neural network. For example, the first language is English.

The text translation model information 122 is information for constructing a text translation model. The text translation model outputs an output text obtained by translating an input text written in the first language into a second language. The input text may be a replacement text in which a named entity is replaced with a placeholder. For example, the text translation model is a learned neural network. At this time, the text translation model information 122 is a weight or a bias of the neural network. For example, the second language is Japanese.

The named entity translation model information 123 is information for constructing a named entity translation model. The named entity translation model outputs a representation obtained by translating a named entity written in the first language into the second language. For example, the named entity translation model is a learned neural network. In this case, the named entity translation model information 123 is a weight or bias of the neural network.

As described above, the named entity is a proper noun such as a person name or an organization name, a numerical representation such as a date or a time, a technical term such as a chemical substance name, a gene name, a drug name, or the like. The term "named entity" may be referred to as "unique phrase (expression)".

The dictionary information 124 is information in which a named entity written in the first language and a representation obtained by translating the named entity into the second language are associated with each other. The dictionary information 124 may be information collected from the outside or information obtained in each process in the translation apparatus 10. For example, the dictionary information 124 is used for learning the named entity translation model.

The control unit 13 is implemented by a program stored in an internal storage apparatus and is executed by, for example, a central processing unit (CPU), a microprocessor unit (MPU), or a graphics processing unit (GPU) by using a random-access memory (RAM) as a workspace. The control unit 13 may also be implemented as, for example, an integrated circuit, such as an application specific integrated circuit (ASIC) or a field-programmable gate array (FPGA). The control unit 13 includes a conversion unit 131, a learning unit 132, a translation unit 133, and an extraction unit 134.

The conversion unit 131 converts a text written in the first language into a replacement text in which a named entity in the text is replaced with a placeholder. At this time, the conversion unit 131 specifies the named entity by using a specification model constructed based on the specification model information 121. The placeholder is an example of a predetermined character string.

In a case where the replacement text in which the named entity in the text written in the first language is replaced with a predetermined placeholder is input, the learning unit 132 performs learning of a text translation model which is a neural network so as to output a text obtained by translating the replacement text into the second language. In a case where the named entity replaced with the placeholder is input, the learning unit 132 performs learning of the named entity translation model which is a neural network so as to output a representation obtained by translating the named entity into the second language.

The translation unit 133 translates the replacement text into the second language by using the text translation model which is a neural network. At this time, the translation unit 133 outputs the placeholder included in the replacement text as it is without translation. The translation unit 133 translates the named entity corresponding to the placeholder in the replacement text into the second language by using the named entity translation model which is the neural network.

The extraction unit 134 extracts the named entity in the text written in the first language and the named entity translated into the second language by the translation unit 133 in association with each other. The extraction unit 134 stores the extracted information in the storage unit 12 as the dictionary information 124.

[Learning Process]

Figure 2:
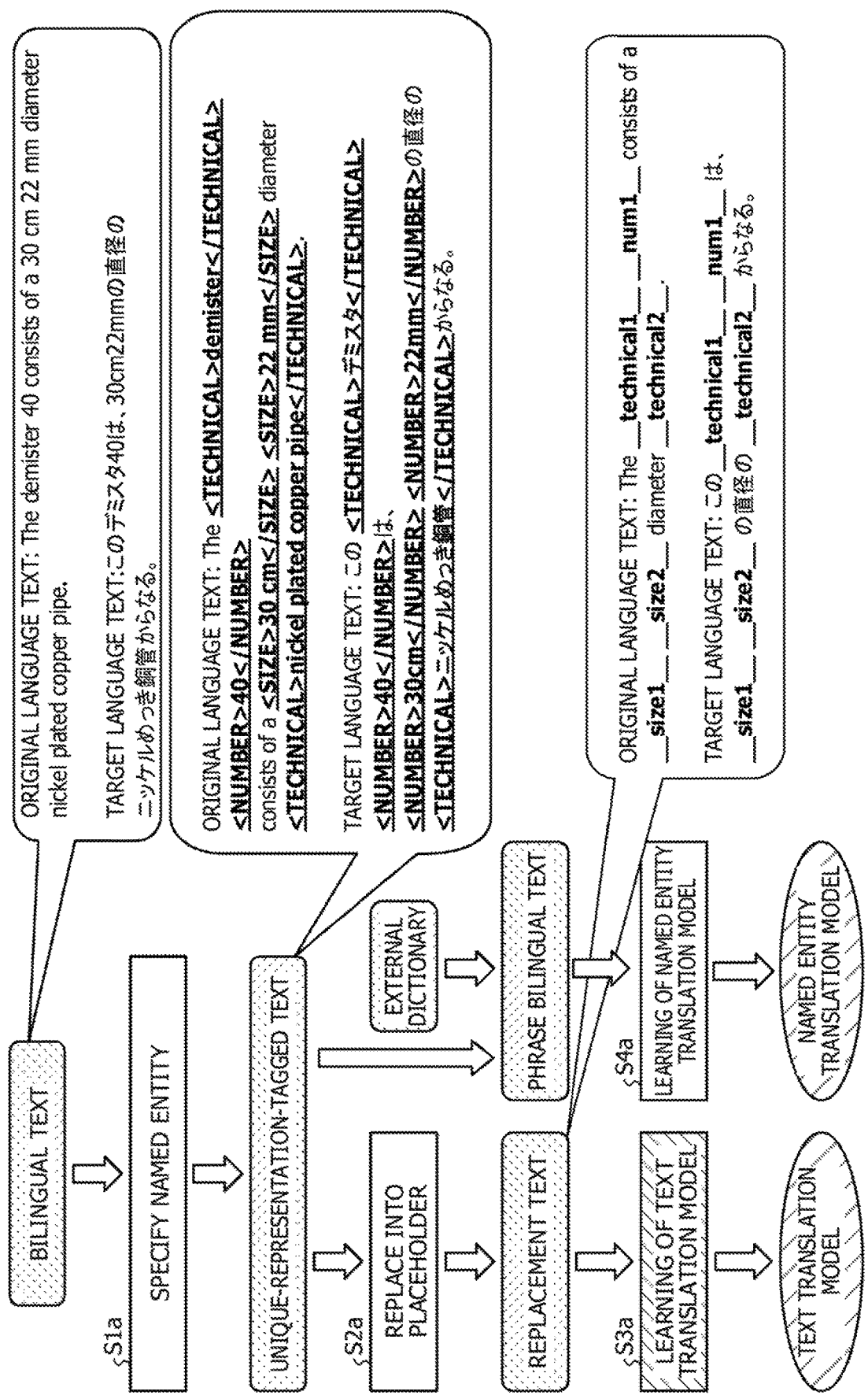
FIG. 2 is a diagram for explaining a learning process.

Hereinafter, a process performed by the translation apparatus 10 will be described in detail. First, a learning process performed by the translation apparatus 10 will be described with reference to FIG. 2. FIG. 2 is a diagram for explaining a learning process. First, it is assumed that a bilingual text is prepared as training data. The bilingual text includes an original language text which is a text of the first language and a target language text obtained by translating the original language text into the second language. The target language text of the bilingual text may be a manually translated text.

The conversion unit 131 specifies a named entity of the bilingual text, and generates a unique-representation-tagged text in which a tag is attached to the specified named entity (step S1a). The conversion unit 131 replaces a tagged representation of the unique-representation-tagged text with a placeholder so as to perform conversion into a replacement text (step S2a).

In the example illustrated in FIG. 2, for example, the conversion unit 131 attaches a tag of "TECHNICAL" to "demister" of the original language text of the bilingual text and " デミスタ " of the target language text of the bilingual text, and replaces them with a placeholder of "_technical1_". The conversion unit 131 attaches the tag of "TECHNICAL" representing a technical term, a tag of "SIZE" representing a size, a tag of "NUM" representing a numerical value, and the like. The tag may be an XML tag such as "<TECHNICAL> . . . </TECHNICAL>". Examples of the placeholder include "_technical1_", "_size1_", "_num1_", and the like.

The learning unit 132 performs learning of the text translation model by using the replacement text as training data (step S3a). Therefore, the text translation model may translate the original language text in which the named entity is replaced with the placeholder into the target language text in which the named entity is replaced with the placeholder. On the other hand, in the text translation model, the named entity corresponding to the placeholder is output as it is without translation.

The learning unit 132 performs learning of the named entity translation model by using a phrase bilingual text as training data (step S4a). The phrase bilingual text is information obtained by pairing a named entity of the original language text and a named entity of the target language text specified from the bilingual text. In the example of FIG. 2, the phrase bilingual text includes information such as "demister: デミスタ" in which "demister" and "デミスタ" are paired. The text translation model may translate the named entity of the original language into the named entity of the target language. The learning unit 132 may appropriately obtain information of an external dictionary so as to improve accuracy of the named entity translation model.

[Translation Process]

Figure 3:
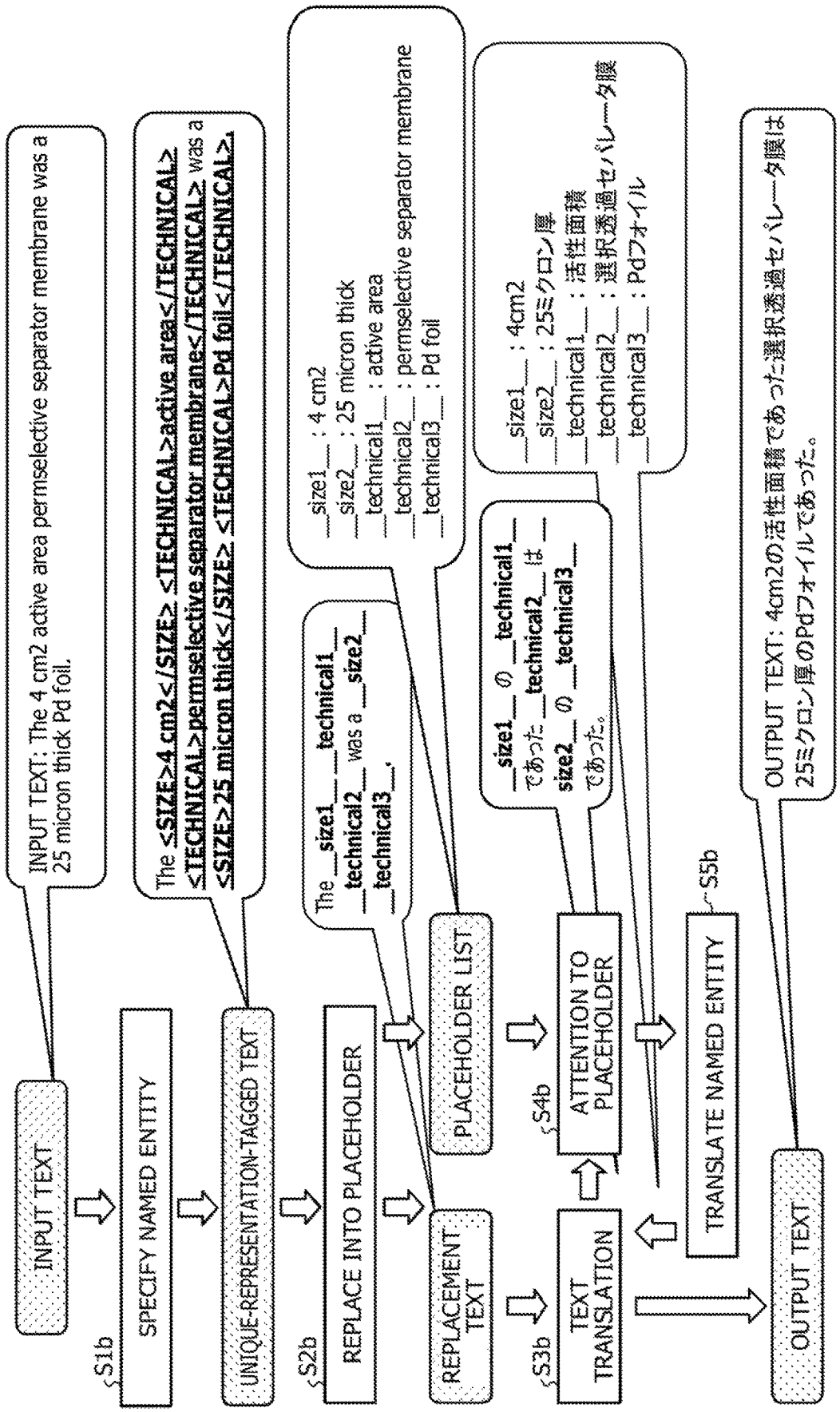
FIG. 3 is a diagram for explaining a translation process.

Next, a translation process by the translation apparatus 10 will be described with reference to FIG. 3. FIG. 3 is a diagram for explaining a translation process. It is assumed that a text translation model and a named entity translation model are models learned in the learning process described above.

The conversion unit 131 specifies a named entity of an input text, and generates a unique-representation-tagged text in which a tag is attached to the specified named entity (step S1b). The conversion unit 131 replaces the tagged representation of the unique-representation-tagged text with a placeholder so as to perform conversion into a replacement text (step S2b). The input text is an original language text which is a text of the first language. It is assumed that the input text is a text to be translated, and that a translated text for the input text is unknown.

In the example illustrated in FIG. 3, for example, the conversion unit 131 attaches a tag of "SIZE" to "4cm2" of the original language text of a bilingual text, and replaces it with a placeholder of "_size1_". The conversion unit 131 generates a placeholder list in which a named entity and a placeholder are listed. For example, the placeholder list includes information such as "_size1_:4cm2", "_technical1_:active area", and "_technical3_:Pd foil".

The translation unit 133 translates the replacement text by using the text translation model (step S3b). At this time, the placeholder is output as a placeholder without being translated by the text translation model. Therefore, the translation unit 133 translates the placeholder by using the named entity translation model (step S5b).

Meanwhile, it is unknown that the placeholder output from the text translation model corresponds to any named entity. Therefore, the translation unit 133 specifies which named entity the placeholder output from the text translation model corresponds to by using an attention mechanism (step S4b). The translation unit 133 may specify which named entity is to be translated by referring to the placeholder list. For example, the attention mechanism is a mechanism which weights an output of a decoder based on an intermediate representation of an encoder. In the following description, it is assumed that the attention mechanism is included in the text translation model.

For example, it is assumed that the text translation model outputs a placeholder. At this time, the translation unit 133 specifies that an output placeholder is "_technical1_" based on an attention score calculated by the attention mechanism. When referring to the placeholder list, it is found that "_technical1_" corresponds to "active area", so that the translation unit 133 translates the "active area" into "活性画槓" by using the named entity translation model.

In the example of FIG. 3, the translation apparatus 10 obtains an output text of "4cm2 の活性画槓 具であった 選択透過セパレータ膜は 50 ミクロン厚の Pd フォイルであった。" from an input text of "The 4 cm2 active area permselective separator membrane was a 25 micron thick Pd foil.".

[Details of Each Model]

Details of the specification model, the text translation model, and the named entity translation model will be described. In the embodiment, each model is assumed to be a neural network.

Figure 4:
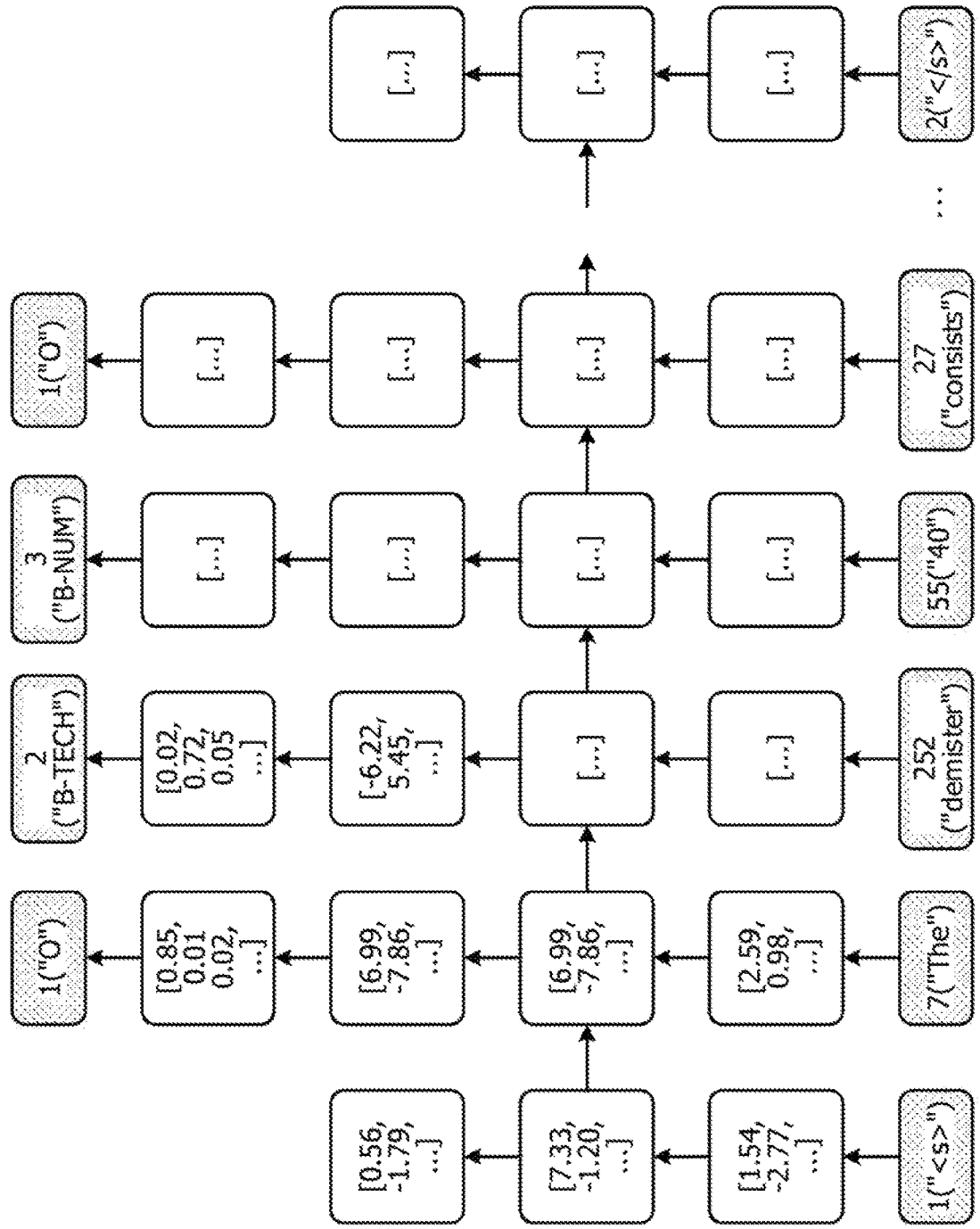
FIG. 4 is a diagram for explaining a specification model.

The specification model will be described with reference to FIG. 4. FIG. 4 is a diagram for explaining a specification model. As illustrated in FIG. 4, the specification model assigns a BIO tag to a unique-representation-tagged text. The BIO tag is assigned to each input word, "B-*" means a start of a named entity, "I-*" means continuation of the named entity, and "O" means non-named entity otherwise. A character string representing a category such as "TECH" or "NUM" is entered in the "*". Since the BIO tag and an XML tag correspond to each other in a one to-one manner, the conversion unit 131 may convert the BIO tag assigned by the specification model into the XML tag. "<s>" means a head of an input text, and "</s>" means an end of the input text.

For example, when a unique-representation-tagged text is manually generated in the learning process illustrated in FIG. 2, the learning unit 132 may perform learning of the specification model by using the unique-representation-tagged text and a bilingual text as training data.

For example, the conversion unit 131 obtains a text of y to which a BIO tag is attached according to Equation (1).

$$y_{tag} = f_{gen}(v) = \mathrm{argmax}_i((v)_i) \quad (1)$$

v is obtained by converting an intermediate state h into probability distribution according to Equation (2).

$$\mathrm{softmax}(h) = v \text{ where } (v)_i = \frac{\exp(h_i)}{\sum_j \exp\sum(h_j)} \quad (2)$$

The intermediate state h is converted from an H dimension to an O dimension by Equation (3).

$$f_{output}(h) = W_{output} \cdot h \, (W_{output} \in R^{O \times H}) \quad (3)$$

In a recursive unit of the specification model, the intermediate state $h_i$ is calculated as illustrated in Equation (4).

$$h_i = f_{RNN}(h_{i-1}, f_{emb}(x))(h_i \in R^H) \quad (4)$$

Embedding of a word on the input text is performed by Equations (5-1) and (5-2).

$$f_{emb}(x) = W_{emb} f_{one\ hot}(x) + b \, (W_{emb} \in R^{E \times V}, b \in R^E) \quad (5\text{-}1)$$

$$f_{one\ hot}(x) = v \text{ where } (v)_i = \begin{cases} 1 & \text{if } i = x \\ 0 & \text{otherwise} \end{cases} (v \in R^V) \quad (5\text{-}2)$$

Figure 5:
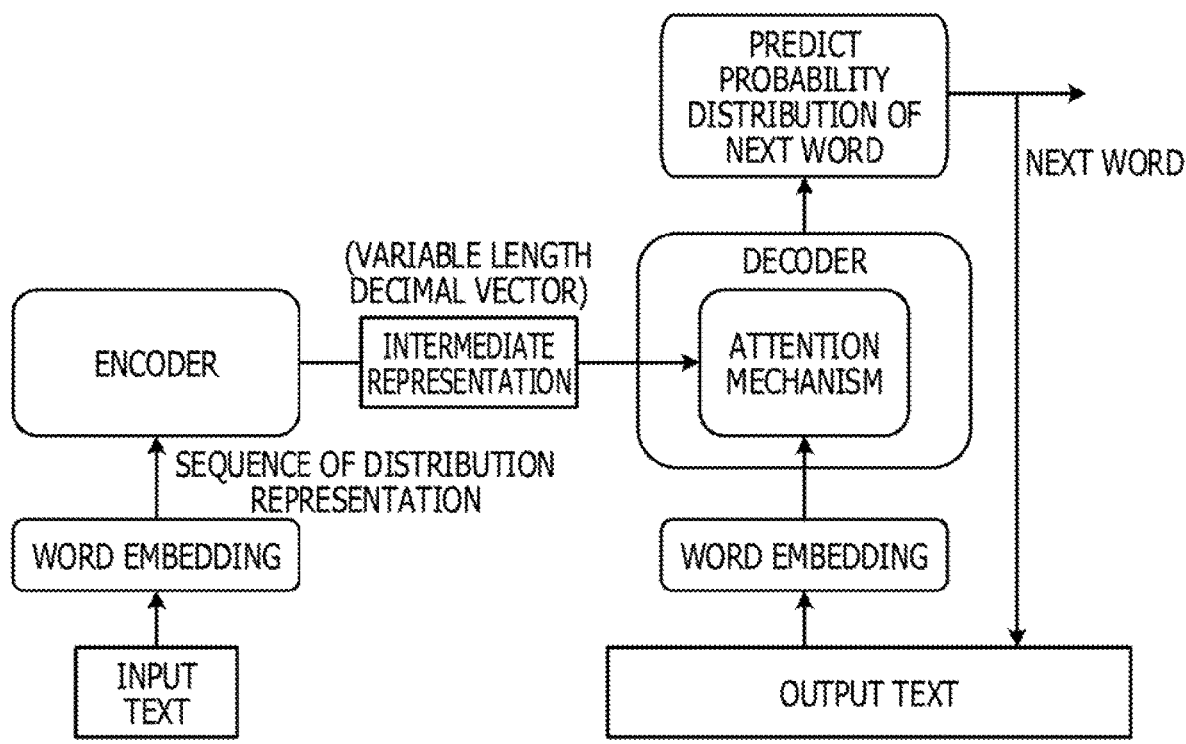
FIG. 5 is a diagram for explaining an encoder and decoder.

In this embodiment, it is assumed that the text translation model is an encoder and decoder. The encoder and decoder will be described with reference to FIG. 5. FIG. 5 is a diagram for explaining an encoder and decoder.

As illustrated in FIG. 5, an input text converted to a unique integer value is input to an encoder. The input text is converted into a fixed-length decimal vector in a word embedding layer (see Equations (5-1) and (5-2)).

The encoder converts a distributed representation into an intermediate representation having a feature amount required for translation. A decoder predicts a generation probability of a word to be generated next from the intermediate representation and the output text, and recursively outputs an ID or the like specifying a word having a maximum probability. The output text here may be a text which is being generated. The decoder includes an attention mechanism.

The translation unit 133 translates a text written in the first language by using the text translation model. The translation model includes the encoder, the decoder, and the attention mechanism. The encoder converts a replacement text into a context vector which is an intermediate representation. The decoder recursively outputs either a word in the second language or a placeholder based on the context vector. The attention mechanism specifies a named entity corresponding to the placeholder output by the decoder based on an attention score based on the context vector. The translation unit 133 performs translation on the named entity specified by the attention mechanism, by using the named entity translation model. An example of the text translation model is a long short term memory (LSTM) using a sequence in which words included in a replacement text are arranged in order of appearance as an input.

Figure 6:
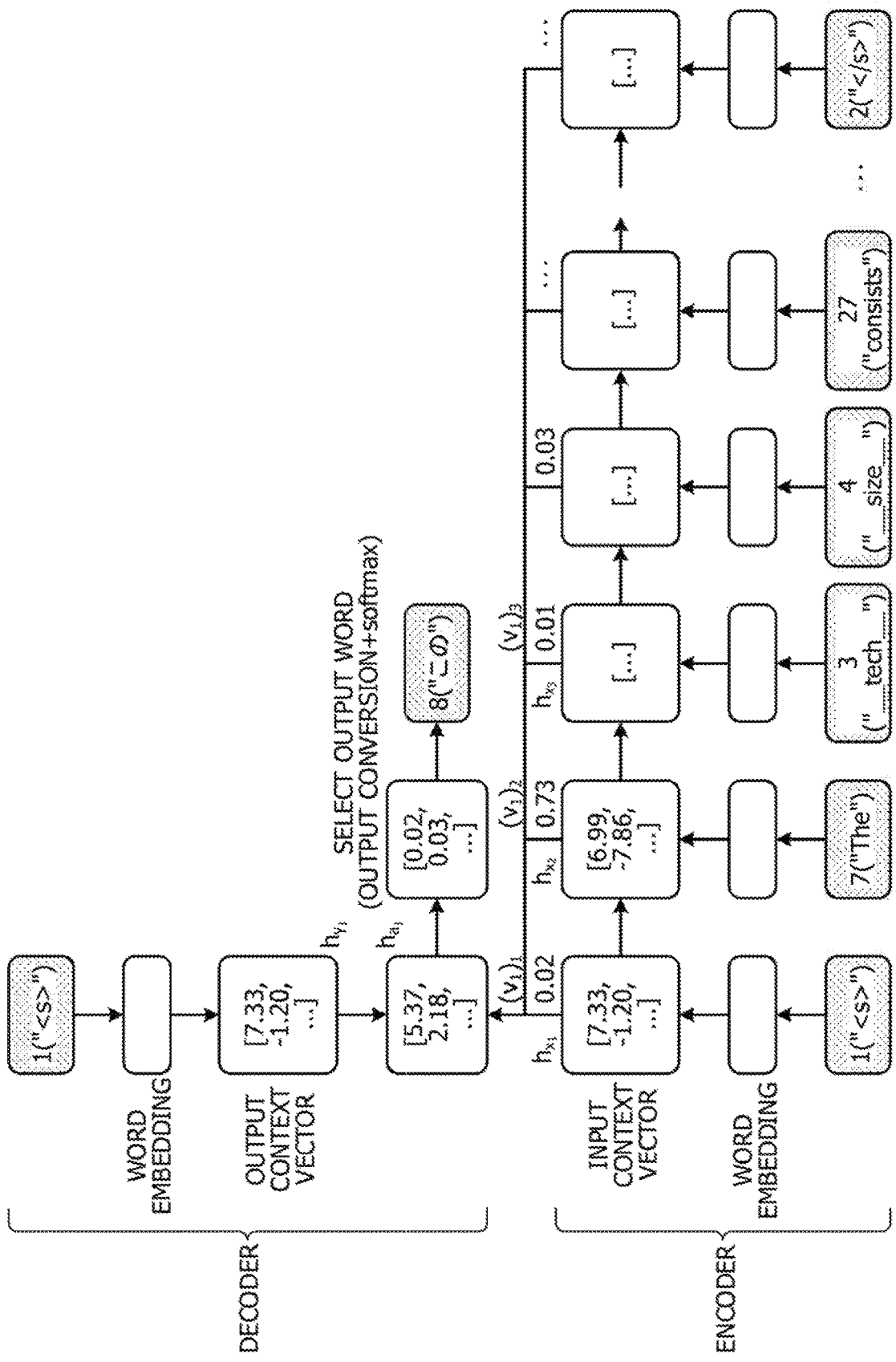
FIG. 6 is a diagram for explaining an output of a word.
Figure 7:
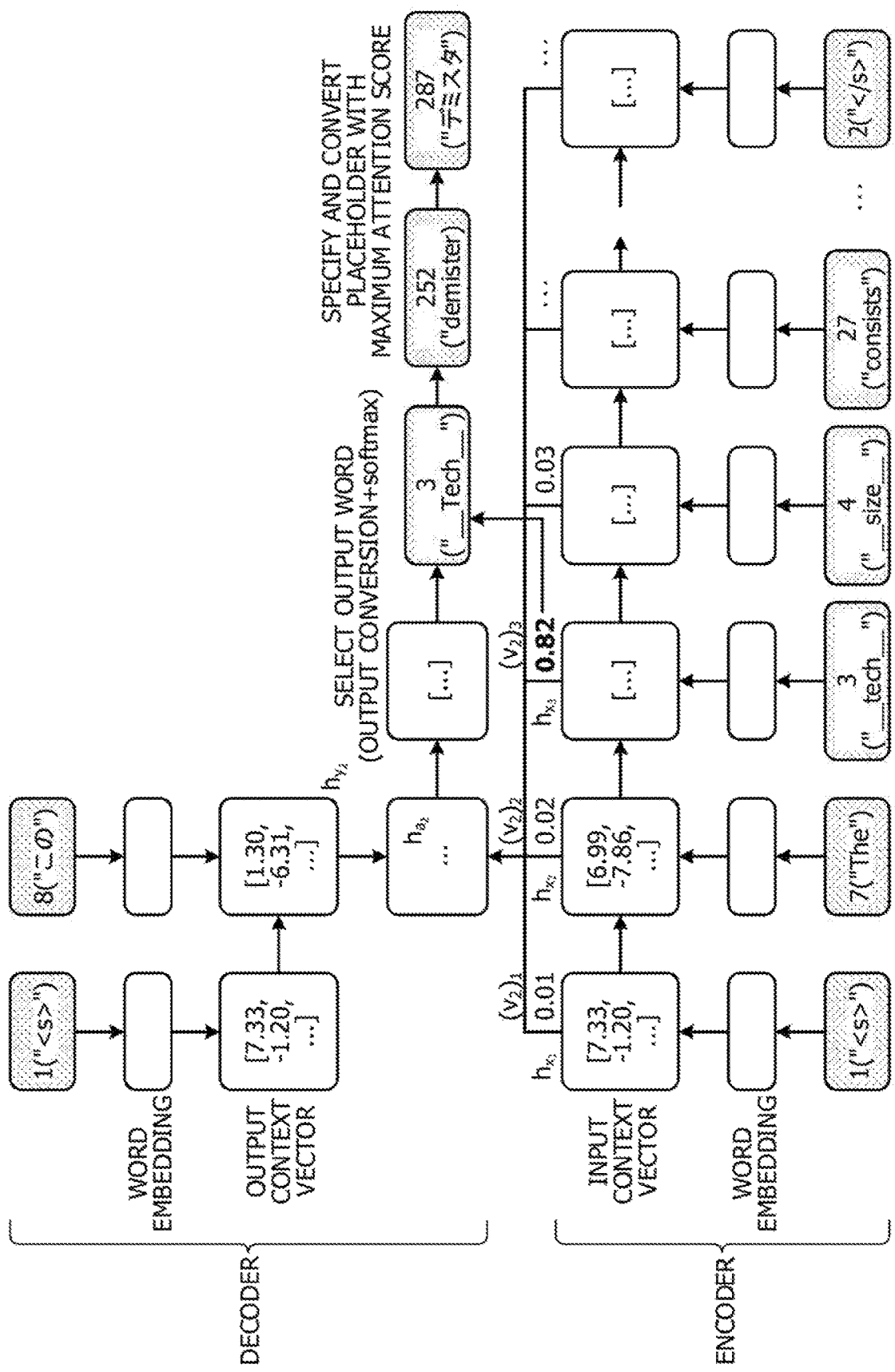
FIG. 7 is a diagram for explaining a translation process on a named entity.
Figure 8:
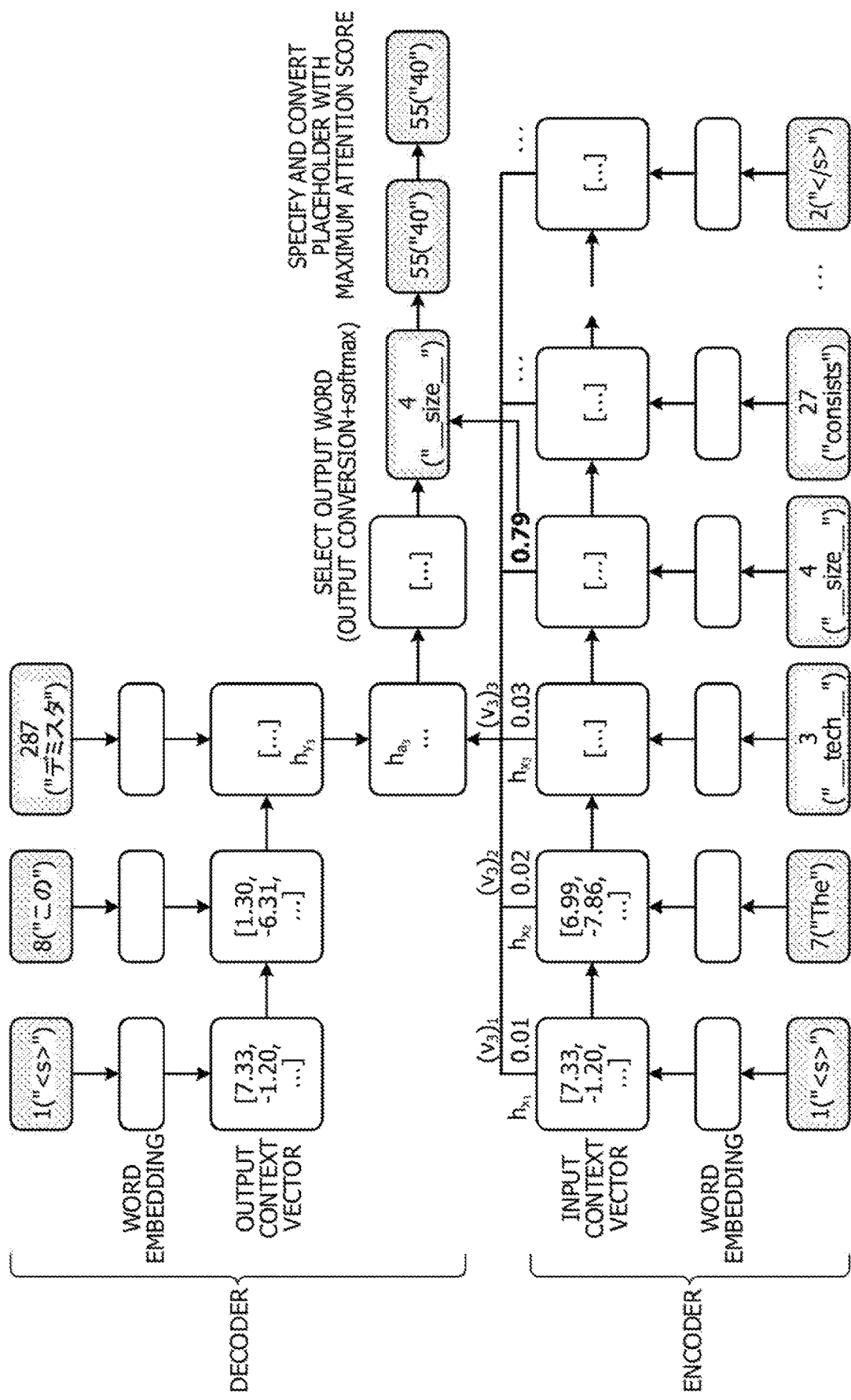
FIG. 8 is a diagram for explaining another translation process on the named entity.

With reference to FIGS. 6 to 8, a text translation model and a named entity translation model will be described. FIG. 6 is a diagram for explaining an output of a word. As illustrated in FIG. 6, the translation unit 133 inputs a word sequence (1, 7, 3, 4, 27, . . . , and 2) to the encoder of the text translation model as an integer value representing a text of the first language. As illustrated in FIG. 6, each integer corresponds to a symbol, a word, a placeholder, or the like.

The encoder generates an input context vector which is an intermediate representation. The translation unit 133 inputs an integer of 1 corresponding to a symbol of "<s>" which means a head of the text to the decoder. The decoder generates an output context vector.

The decoder calculates an attention score from the input context vector and the output context vector according to Equation (6).

$$a_{ij}=f_{score}(h_{x_i},h_{y_i}) \quad (6)$$

The decoder normalizes the attention score according to Equation (7).

$$(v_j)_i = \frac{\exp(a_{ij})}{\sum_i \exp(a_{ij})} \quad (7)$$

The decoder calculates a weighted average of the input context vector according to Equation (8).

$$h_{a_j} = \sum_i (v_j)_i h_{x_i} \quad (8)$$

The decoder converts the weighted average of the input context vector into probability distribution, and selects a word or placeholder having the highest possibility. The decoder selects and outputs an integer of 8 corresponding to a word of "この". The translation unit 133 recursively inputs the output integer of 8 to the decoder.

It is assumed that the decoder selects a placeholder for an input of the integer of 8. For example, the decoder determines that a named entity is followed by "この". A process by the attention mechanism in this case will be described with reference to FIG. 7. FIG. 7 is a diagram for explaining a translation process on a named entity.

At this time, the attention mechanism specifies a placeholder having a maximum attention score. In the example in FIG. 7, the attention mechanism specifies a placeholder corresponding to an intermediate representation of $h_{x3}$, for example, "_tech_", which is represented by an integer of 3. The translation unit 133 obtains a named entity of "demister" corresponding to the placeholder "_tech_" from a placeholder list, and inputs the named entity of "demister" to the named entity translation model. The named entity translation model outputs an integer of 287 corresponding to the "デミスタ" obtained by translating "demister" into the second language.

As illustrated in FIG. 8, the translation unit 133 inputs the integer of 287 corresponding to the "デミスタ" to the decoder. FIG. 8 is a diagram for explaining another translation process on the named entity. At this time, the decoder selects a placeholder. The attention mechanism specifies that the placeholder is "_size_" corresponding to a named entity of "40". The named entity translation model outputs "40" obtained by translating the named entity of "40" into the second language. In this case, since "40" is a word common to the first language and the second language, "40" does not change as a character string even when translated.

At this time, the translation unit 133 obtains an output text of "このデミスタ 40", so that the named entity may be accurately translated.

Figure 9:
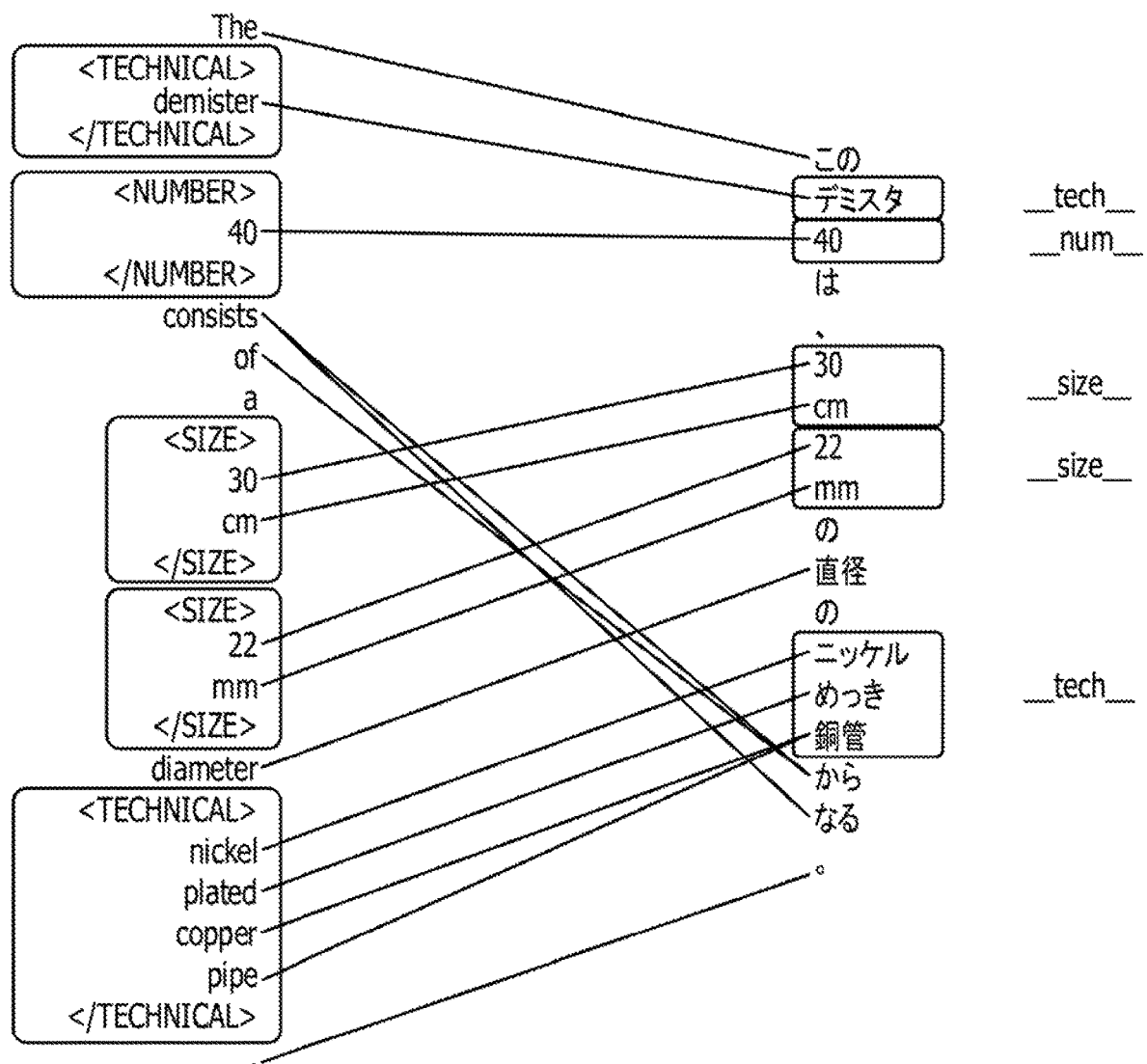
FIG. 9 is a diagram for explaining extraction of dictionary information.

FIG. 9 is a diagram for explaining extraction of dictionary information. As illustrated in FIG. 9, the extraction unit 134 may extract the dictionary information 124 in a process in which replacement from a unique-representation-tagged text to a placeholder is performed in a learning process. The conversion unit 131 performs correspondence between a word in the first language and a word in the second language by using, for example, an IBM model. For example, as illustrated in FIG. 9, a word of "デミスタ" in the first language to which a tag of "TECHNICAL" is attached is associated with a word of "demister" in the second language, and is replaced with a placeholder of "_tech_". Therefore, the extraction unit 134 may extract information of "demister: デミスタ".

[Flow of Process]

Figure 10:
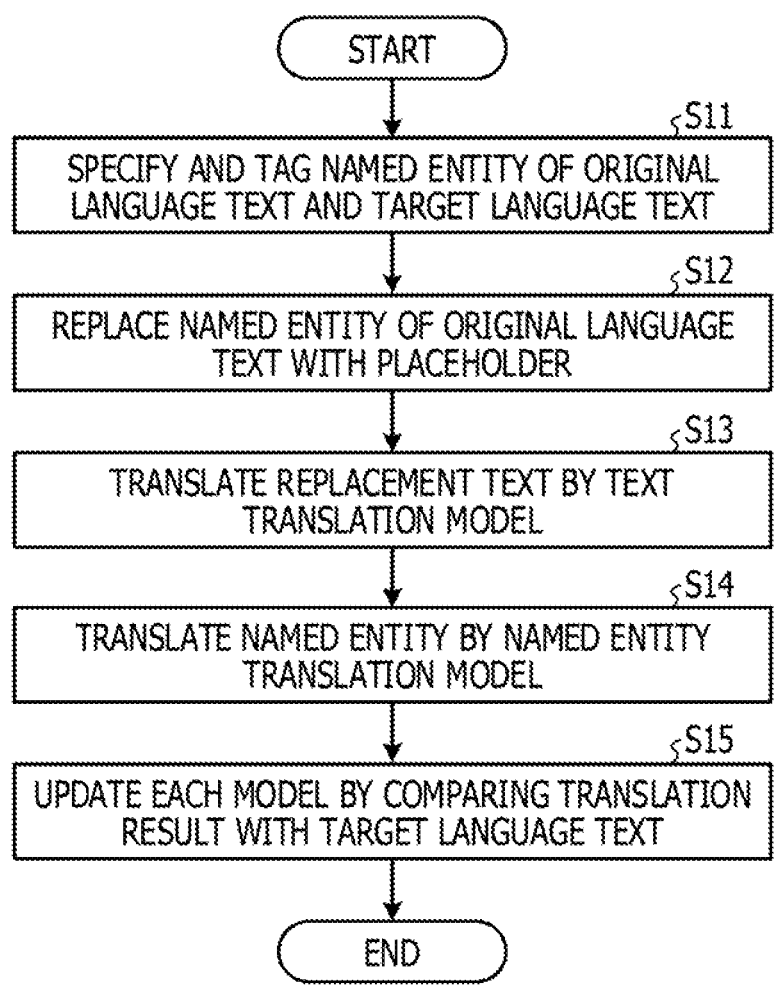
FIG. 10 is a flowchart illustrating a flow of the learning process.

A flow of a learning process by the translation apparatus 10 will be described with reference to FIG. 10. FIG. 10 is a flowchart illustrating the flow of the learning process. As illustrated in FIG. 10, first, the translation apparatus 10 specifies and tags a named entity from an original language text and a target language text (step S11). Next, the translation apparatus 10 replaces the named entity of the original language text with a placeholder (step S12).

The translation apparatus 10 translates a replacement text by the text translation model (step S13). The translation apparatus 10 translates the named entity in the named entity translation model (step S14). The translation apparatus 10 compares the translation result with the target language text, and updates each model (step S15).

Figure 11:
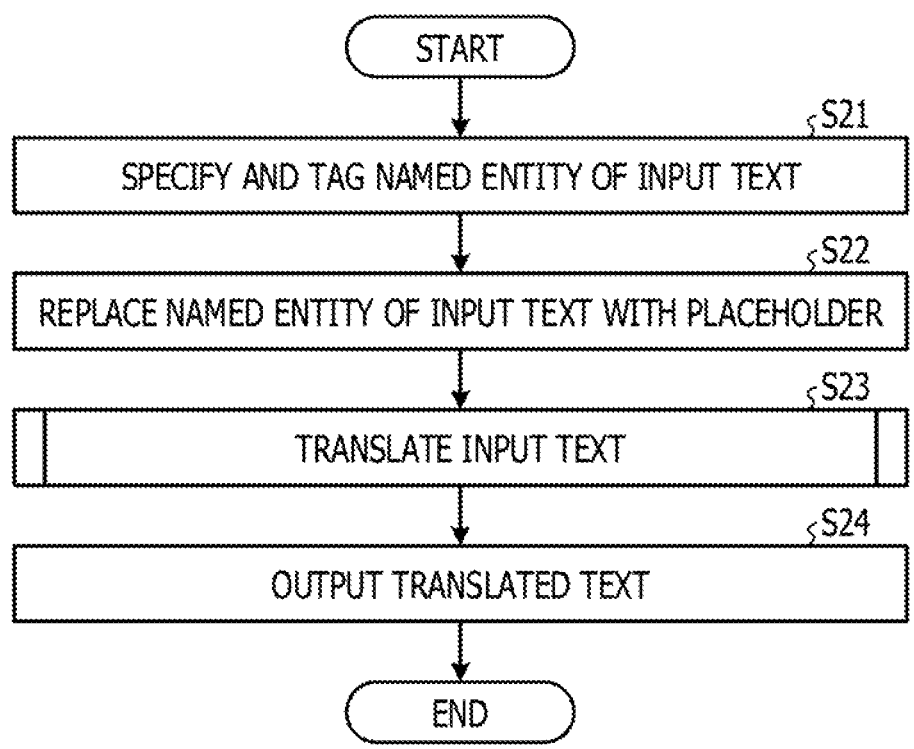
FIG. 11 is a flowchart illustrating a flow of the translation process.

A flow of a translation process by the translation apparatus 10 will be described with reference to FIG. 11. FIG. 11 is a flowchart illustrating the flow of the translation process. As illustrated in FIG. 11, first, the translation apparatus 10 specifies and tags a named entity from an input text (step S21). Next, the translation apparatus 10 replaces the named entity of the input text with a placeholder (step S22). The translation apparatus 10 translates the input text by using each model (step S23), and outputs a translated text (step S24).

Figure 12:
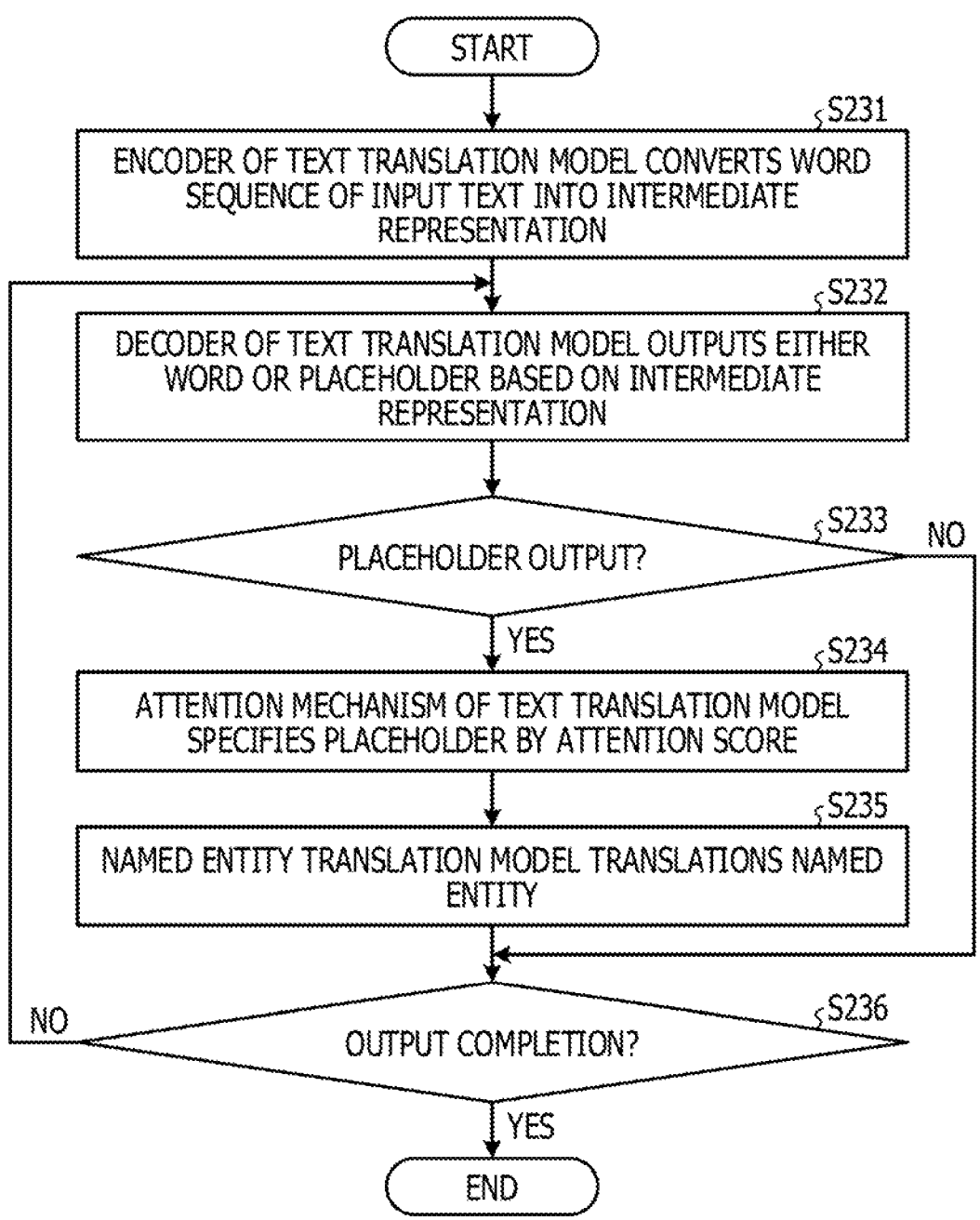
FIG. 12 is a flowchart illustrating a flow of a process by a model.

A flow of a process according to a model will be described with reference to FIG. 12. FIG. 12 is a flowchart illustrating the flow of the process by the model. The process in FIG. 12 corresponds to step S23 in FIG. 11. First, an encoder of a text translation model converts a word sequence of an input text into an intermediate representation (step S231). Next, a decoder of the text translation model outputs either a word or a placeholder based on the intermediate representation (step S232).

In a case where the decoder outputs the placeholder (Yes in step S233), an attention mechanism of the text translation model specifies the placeholder by an attention score (step S234). A named entity translation model translates a named entity corresponding to the specified placeholder (step S235). In a case where the decoder outputs the word (No in step S233), the named entity translation model does not perform translation.

In a case where the output by the decoder is not completed (No in step S236), the decoder returns to step S232 and further executes the process. In a case where the output by the decoder is completed (Yes in step S236), the translation apparatus 10 terminates the process by the model.

[Effects]

As described above, the translation apparatus 10 converts a text written in the first language into a replacement text in which a named entity in the text is replaced with a predetermined character string (a placeholder). The translation apparatus 10 translates the replacement text into the second language by using a text translation model which is a neural network. The translation apparatus 10 translates the named entity corresponding to the predetermined character string in the replacement text into the second language by using a named entity translation model which is a neural network. In this manner, the translation apparatus 10 performs the translation by using both of the model of translating the entire text and the model of performing translation of the named entity. While the text translation model performs translation on the entire text as a processing unit, the named entity translation model performs translation of words and phrases by a transliteration or character level, using a shorter subword and a character as a processing unit. Therefore, according to the embodiment, it is possible to appropriately translate the named entity.

Figure 14:
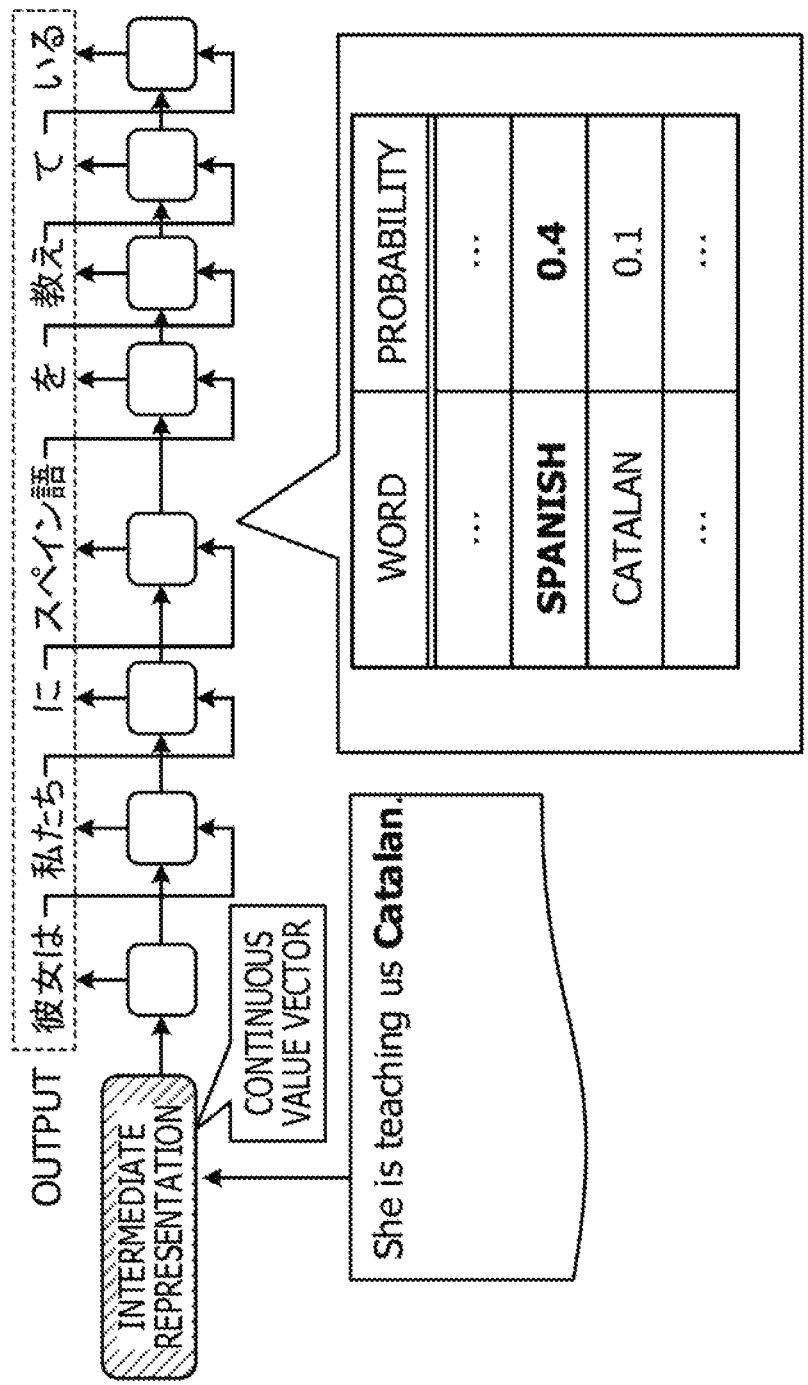
FIG. 14 illustrates a translation result in the related art.

FIG. 14 is a diagram illustrating a translation result in the related art. As illustrated in FIG. 14, in a translation model in the related art, in some cases, as translation of "Catalan" which means " カタルーニヤ語 (Catalan)", a result that a probability of " スペイン語 (Spanish)" is higher than a probability of " カタルーニヤ語 (Catalan)" is output. Such mistranslation may occur in a case where an appearance frequency of " スペイン語 (Spanish)" in training data in the same context is larger than an appearance frequency of the " カタルーニヤ語 (Catalan)".

On the contrary, since the translation apparatus 10 of the embodiment performs translation by using the named entity translation model after replacing "Catalan" with a placeholder, it is conceivable to perform translation more accurately than in the related art.

FIG. 15 is a diagram illustrating another translation result in the related art. "Permselective separator" is to be correctly translated as a " 選択透過セパレータ膜 ". "Pd foil" is to be correctly translated as a "Pd フォイル ".

On the contrary, as illustrated in FIG. 15, in some cases, a translation model in the related art performs translation by ignoring the "permselective separator". In some cases, the translation model in the related art translates "Pd foil" as " 機能箔 (functional foil)". Such mistranslation or translation omission may occur in a case where the translation model does not originally learn these named entities.

On the contrary, in the translation apparatus 10 of the embodiment, even in a case where the named entity itself is not learned, it is considered that the named entity may be accurately translated by the learned named entity translation model.

For example, in the text translation model, a vocabulary size or a text length (the number of tokens) is reduced as compared with learning by a bilingual text including a named entity, so that the learning of the context pattern is facilitated, and as a result, accuracy of word order and function word placement is accordingly improved. On the other hand, in the named entity translation model, since it is not required to consider a context as long as a phrase of the named entity is thoroughly translated, it becomes possible to perform translation with high accuracy with a finer granularity such as a character level.

The translation apparatus 10 translates a text written in the first language by using the text translation model. The text translation model includes an encoder, a decoder, and an attention mechanism. The encoder converts a replacement text into a context vector which is an intermediate representation. The decoder recursively outputs either a word in the second language or predetermined character string (a placeholder) based on the context vector. The attention mechanism specifies a named entity corresponding to the predetermined character string output by the decoder based on an attention score based on the context vector. The translation apparatus 10 performs translation on the named entity specified by the attention mechanism, by using the named entity translation model. The translation apparatus 10 may specify the named entity corresponding to the predetermined character string, and may further improve accuracy of the translation of the named entity.

The decoder of the text translation model updates an output context vector by inputting the sequence in which words included in the replacement text are arranged in an order of appearance. The translation apparatus 10 may perform translation along the context. The decoder of the text translation model is, for example, an LSTM.

The translation apparatus 10 extracts the named entity in the text written in the first language and the named entity translated into the second language in association with each other. The translation apparatus 10 extracts dictionary information, and may further improve translation accuracy of the named entity by using the extracted dictionary information.

In a case where the replacement text in which the named entity in the text written in the first language is replaced with the predetermined character string (the placeholder) is input, the translation apparatus 10 performs learning of a text translation model which is a neural network so as to output a text obtained by translating the replacement text into the second language. In a case where the named entity replaced with the predetermined character string is input, the translation apparatus 10 performs learning of the named entity translation model which is a neural network so as to output a representation obtained by translating the named entity into the second language. In this manner, the translation apparatus 10 may perform learning of both the text translation model and the named entity translation model by using the bilingual text. Therefore, according to the embodiment, it is possible to improve both accuracy of the translation of the text and translation accuracy of the named entity by learning using the bilingual text.

It is assumed that there is a document in the specialty field and named entities are included in a 90% of the text. It is assumed that 20% among words of the entire document constitute named entities. Specific accuracy of the named entity according to the specification model is set to 90%. In a case where named entity information in the text is given, perfect matching accuracy of the named entity translation of the named entity translation model is set to 98%. In a case of the translation model in the related art, it is assumed that 25% of the texts including the named entity include mistranslation. According to the text translation model, it is possible to select an appropriate named entity for a translation target at 90% or more of texts including named entities.

Since the named entity is generally an important keyword, quality of the translation is considered to be low in a case where there is only one mistranslation in the named entity. In the case of the translation model in the related art, a proportion of texts including mistranslation of the named entity is 90%×25%=22.5%. On the other hand, in a case where the text translation model and the named entity translation model are used in combination as in the embodiment, a ratio of texts including mistranslation of the named entity is 90%×(90%×2%+10%×25%)=3.87%, and mistranslation of approximately 18.63% may be reduced. For example, a correct answer rate of the named entity is 75% to 95.7%, and accuracy is improved by approximately 20.7%.

The translation apparatus 10 may be configured such that all of the specification model, the text translation model, and the named entity translation model are used as the encoder and decoder, the learning of each model is performed by multi-task learning, and the intermediate representation of the encoder is shared. Performance of each model is further improved.

[System]

Processing procedures, control procedures, specific names, and information including various kinds of data and parameters indicated in the specification and the drawings may be changed in any manner unless otherwise specified. The specific examples, distributions, numerical values, and so on described in the embodiment are merely examples and may be changed in a given manner.

The constituent components of the apparatuses illustrated in the drawings are functionally conceptual and may not be physically configured as illustrated in the drawings. For example, specific forms of distribution and integration of the apparatuses are not limited to those illustrated in the drawings. For example, for example, all or some of the apparatuses may be configured to be distributed or integrated functionally or physically in given units depending on various loads, usage conditions, and so on. All or given some of processing functions performed by the apparatuses may be implemented by a central processing unit (CPU) and a program to be analyzed and executed by the CPU, or may be implemented as hardware by wired logic.

[Hardware]

Figure 13:
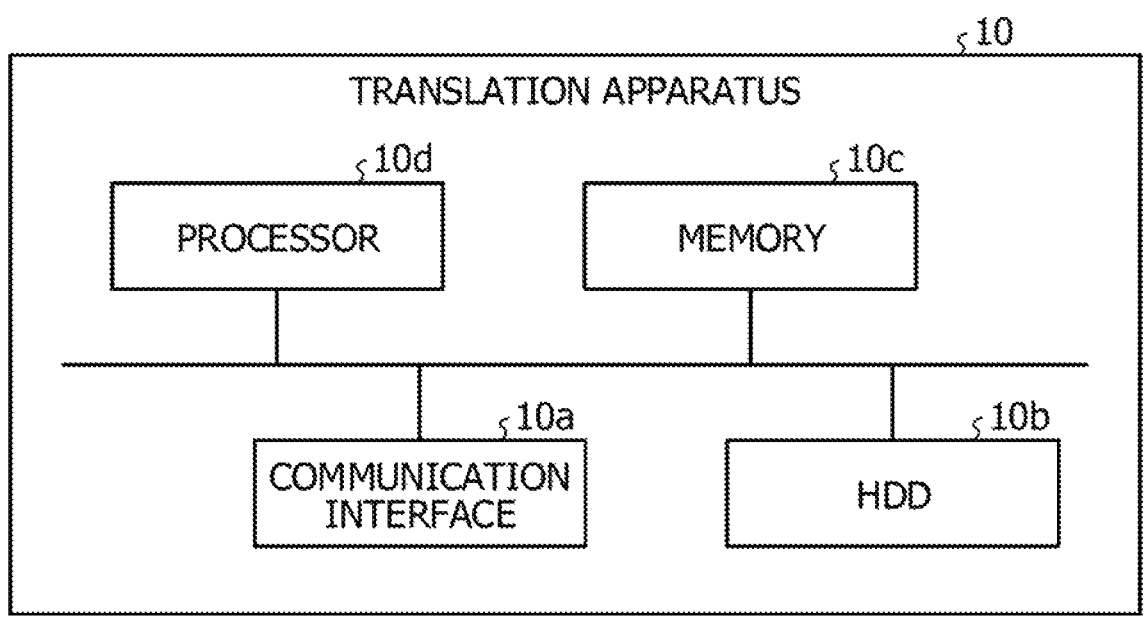
FIG. 13 is a diagram illustrating an example of a hardware configuration.

FIG. 13 is a diagram for explaining a hardware configuration example. As illustrated in FIG. 13, the translation apparatus 10 includes a communication interface 10a, a hard disk drive (HDD) 10b, a memory 10c, and a processor 10d. The respective units illustrated in FIG. 13 are coupled to each other by a bus or the like.

The communication interface 10a is a network interface card or the like and performs communication with other servers. The HDD 10b stores a program or a database (DB) for causing the functional units illustrated in FIG. 1 to operate.

The processor 10d executes processes which implement the functions illustrated in, for example, FIG. 1 by reading from the HDD 10b or the like the program which implements processing operations identical to those of the processing units illustrated in FIG. 1 and loading the program into the memory 10c. For example, in the process, the same function as that of each processing unit included in the translation apparatus 10 is executed. For example, the processor 10d reads out a program having the same functions as those of the conversion unit 131, the learning unit 132, the translation unit 133, and the extraction unit 134 from the HDD 10b and the like. The processor 10d executes a process of executing the same process as those of the conversion unit 131, the learning unit 132, the translation unit 133, the extraction unit 134, and the like. The processor 10d is, for example, a hardware circuit such as a CPU, a MPU, and an ASIC.

As described above, the translation apparatus 10 operates as an information processing apparatus which executes a categorization method by reading and executing a program. The translation apparatus 10 may also implement the same functions as that of the embodiment described above by reading the program from a recording medium with the use of a medium reading apparatus and executing the read program. The program described in other embodiments is not limited to the program executed by the translation apparatus 10. For example, the present disclosure may also be applied to cases where another computer or a server executes the program and where the other computer and the server execute the program in cooperation with each other.

The program may be distributed via a network such as the Internet. The program may be recorded on a computer-readable storage medium such as a hard disk, a flexible disk (FD), a compact disc read-only memory (CD-ROM), a magneto-optical disk (MO), or a digital versatile disc (DVD) and may be executed after being read from the storage medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A translation method, implemented by a computer, the method comprising:
    converting a text written in a first language into a replacement text in which each of one or more of named entities in the text is replaced with a predetermined character string;
    generating a translated replacement text by translating the replacement text from the first language to a second language by using a text translation model which is a neural network;
    converting the replacement text into a context vector which is an intermediate representation;
    identifying, based on an attention score calculated by using the context vector, from among the one or more of named entities, a named entity corresponding to the predetermined character string in the translated replacement text to extract the identified named entity from the text written in the first language;
    generating a translated named entity by translating, in a state where separated from the text, the extracted identified named entity from the first language to the second language by using a named entity translation model, the named entity translation model being a neural network trained by using a plural pieces of training data each of which includes a named entity in the first language and a named entity in the second language; and generating a translated text by replacing the predetermined character string in the translated replacement text with the translated named entity.

2. The translation method according to claim 1, the text translation model including an encoder, a decoder, and an attention mechanism, wherein the converting of the replacement text is performed by the encoder configured to convert the replacement text into the context vector which is the intermediate representation, the translating of the replacement text is performed by the decoder configured to recursively output, based on the context vector, either a word in the second language or the predetermined character string, and the identifying of the named entity is performed by the attention mechanism configured to identify, based on the attention score by using the context vector, the named entity corresponding to the predetermined character string output by the decoder, and the translating of the named entity is performed on the named entity identified by the attention mechanism.

3. The translation method to claim 1, wherein in the process of translating the replacement text into the second language, translation is performed by using a long short term memory (LSTM) using a sequence in which words included in the replacement text are arranged in order of appearance as an input.

4. The translation method to claim 1, the method further comprising:

extracting a first named entity in the text written in the first language and a second named entity translated from the first named entity into the second language to output a pair of the first named entity in the first language and the second named entity in the second language.

5. A non-transitory computer-readable storage medium for storing a translation program which causes a processor to perform processing, the processing comprising:

converting a text written in a first language into a replacement text in which each of one or more of named entities in the text is replaced with a predetermined character string;

generating a translated replacement text by translating the replacement text from the first language to a second language by using a text translation model which is a neural network;

converting the replacement text into a context vector which is an intermediate representation;

identifying, based on an attention score calculated by using the context vector, from among the one or more of named entities, a named entity corresponding to the predetermined character string in the translated replacement text to extract the identified named entity from the text written in the first language;

generating a translated named entity by translating, in a state where separated from the text, the extracted identified named entity from the first language to the second language by using a named entity translation model, the named entity translation model being a neural network trained by using a plural pieces of training data each of which includes a named entity in the first language and a named entity in the second language; and generating a translated text by replacing the predetermined character string in the translated replacement text with the translated named entity.

* * * * *